Patented Jan. 30, 1951

2,539,424

UNITED STATES PATENT OFFICE 2,539,424

ESTERS OF P₂S₅-AMINE REACTION PRODUCTS AS LUBRICATING OIL ADDITIVES AND LUBRICANTS CONTAINING SAME

Everett C. Hughes, Cleveland Heights, and John D. Bartleson, Cleveland, Ohio, assignors to The Standard Oil Company, Cleveland, Ohio, a corporation of Ohio No Drawing. Application May 18, 1946, Serial No. 670,848

16 Claims. (Cl. 252—46.7)

This invention relates to lubricants and lubricant additives suitable for use under various conditions, including high temperatures or high pressures, or both, as for instance, use in an internal combustion engine operating at higher temperatures and in which the lubricant is in close contact with metallic surfaces, metal compounds and high temperature gases, and use as gear lubricants when surfaces must be lubricated which are subjected to high pressures.

The objects achieved in accordance with the present invention include the provision of an agent which may be useful itself as a lubricant, and which when added to lubricants will markedly inhibit the very objectionable deposition of lacquer, and, at the same time, inhibit acid and sludge formation, corrosion and other types of deterioration occurring under operating conditions; the provision of lubricating oils containing an ash-free addition agent; and other objects which will be apparent as embodiments of the invention are disclosed hereinafter.

In accordance with the invention, it has been found that ester derivatives of reaction products of phosphorus sulfides reacted with amines at elevated temperatures have good solubility in oils and greases, and have highly advantageous properties as additives for lubricants; e. g. to improve the corrosion, lacquer, sludge, viscosity increase, and the like characteristics thereof.

The ester derivatives may be prepared by reaction of the sulfide-amine reaction products with one or more alcohols, or thio-alcohols, or alkyl, aryl, cycloalkyl, and heterocyclic compounds containing an alcoholic or thio-alcoholic group. These alcohols may be illustrated by the following: methanol, ethanol, isopropanol, normal propanol, a butanol, a pentanol, an isopentanol, a cyclohexanol, a benzyl alcohol, phenyl ethyl alcohol, phenol, a methyl phenol, a polyalkyl phenol, ethyl phenol, diethyl phenyl, alkoxy phenols, methoxy phenol, a hydroxy pyridine, a hydroxy quinoline, a hydroxy isoquinoline, a hydroxy alkanolamine, ethanolamine, diethanolamine, triethanolamine, polyhydric alcohols, ethylene glycol, diethylene glycol, propylene glycol, glycerine, resorcinol, and (ring) alkyl substituted resorcinol, phloroglucinol, and the like alcohols, and the corresponding thiol alcohols or mercaptans. The word alcohol is used in its generic sense to include any of the above types of compounds. The alcohol used in forming the ester should be selected with reference to the use of the final composition and the properties desired in it.

It is preferred that the starting primary sulfide-amine reaction product be made at or heated to temperatures above 400° F. and not substantially above 600° F.

The reaction of forming the ester derivatives may be carried out at temperatures in about the range of about 100° to 400° F., a temperature of 180° to 280° F. being preferred. This reaction is usually completed in four hours or less time, and the same factors as to reaction time are involved as discussed hereinafter. A diluent may be used, as described hereinafter, in making the ester derivative but a diluent is not necessary. If a diluent is used in the sulfide-amine reaction, it can be be carried over into the reaction step of forming the ester derivative and be subsequently separated, if desired. From about 0.2 to about 6.0 equivalents of the esterifying agent may be used per mol of the sulfide in the sulfide-amine reaction product, preferably about to about 4.0 equivalents. An equivalent is the quotient of a mol divided by the valence (e. g. number of alcoholic groups in the molecule) of the agent used.

An additional improvement results if additional reacted sulfur is present in the additive. About 0.01 to 2.0 and preferably 0.1 to 0.7 gram atoms of sulfur per gram mol of the amine is desirable. This sulfur can be incorporated by adding elemental sulfur, preferably after the formation and cooling of the high temperature primary reaction product, and maintaining the mass at about 200° to 300° F. for about a few minutes to several hours, and preferably about one hour. Selenium and tellurium function in much the same way as sulfur in this respect, and may be incorporated similarly. The sulfur can also be added to the ester derivatives.

The sulfide-amine starting material may be prepared by direct admixture of the reactants, or their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, since a diluent is not necessary.

The reaction is usually complete in four hours or less time. The reaction time is a function of the temperature, the amount of the sulfide that is to react, the subdivision of the sulfide, rate of stirring, etc.

The sulfide-amine reaction product should be prepared at, or subsequently subjected to, an elevated temperature of at least about 400° F., desirably in the range of about 430° to 530° F., and preferably about 500° F. at atmospheric pressure. Economy of heat suggests that a temperature higher than that necessary to carry out the reaction will be wasteful. The temperature should not be so high as to decompose the reaction product, and 600° F. may be viewed as a practical economic upper limit, although much higher temperatures produce a satisfactory product. The reaction time varies somewhat with the amine used and the temperature, and falls within the general range of from 1 minute to about 6 hours, desirably from about ¼ to about ¾ hours and preferably about ½ hour. The reaction is somewhat exothermic and on a commercial scale the heat evolved thereby may be used to maintain the temperature. The ingredients may be added in increments if this is desirable for temperature control or for other reasons.

It has been proposed heretofore to react $PCl_3$, $POCl_3$, and $PSCl_3$ with various amines. In this proposal the temperatures used are relatively low, i. e., a maximum of 240° to 265° F. The art has suggested, contrary to fact, that $P_2S_5$ might be the equivalent of the above halogenated compounds. We have found that when $P_2S_5$ is reacted with an amine having at least twelve carbon atoms, and under the above conditions, the products are difficultly soluble in oil. We have also noted that during such a reaction no gaseous byproducts are evolved.

The amine or mixture of amines may be reacted with the phosphorus sulfide or mixture of phosphorus sulfides in mol ratios of one mol of amine to from 0.5 to 2.5 or more mols of sulfide. Even small amounts show a significant improvement. Economic factors may make it undesirable to use more than about 2.5 mols of the sulfide. Generally, about 0.7 to 2.2 mols is the usual range that will be used, and about 1.0 to about 1.5 is especially desirable.

The pentasulfide is preferred although other phosphorus sulfides or mixtures of sulfides may be employed. Phosphorus pentasulfide is most economic and readily available and for this reason is used in the illustrative examples. Under suitable conditions, sulfides of arsenic or antimony may be similarly employed.

A very large variety of amines have been found to react, for example, either aliphatic, aromatic or heterocyclic primary or secondary amines or derivative primary or secondary amines thereof; all of these contain at least one amine hydrogen, which is a hydrogen attached directly to the nitrogen. The choice may be adapted to the desired lubricant solubility characteristics of the primary sulfide-amine or the final ester derivative product. Primary and secondary aliphatic amines which have an aliphatic radical of at least twelve carbon atoms are preferred, and of these the mono- or di-octadecyl or hexadecyl amines or mixtures containing at least one of them are given as illustrative. Analogous polyamines may be used. Commercial dioctadecylamine is a commercially available amine and for this reason is used in the illustrative examples.

The amine stock may be a mixture of different amines of different molecular weight and degrees of substitution and containing unsaturated or saturated radicals. Tertiary amines, or lower primary, secondary, or tertiary amines containing less than twelve carbon atoms may be present.

The yield is very high and appreciable amounts of oil insoluble products are not formed. Generally, the amount of sulfide is chosen so that it will all react at the temperature selected, and the reaction is continued until it is consumed. Associated with the high temperature treatment is the evolution of sulfur containing gas, for instance $H_2S$.

If desired, the primary sulfide-amine reaction product may be converted to a mixed ester, which also contains a metal or nitrogen base radical, or both. The sulfide-amine reaction product may be partially converted to either the ester, the metal or nitrogen base derivative, and then the partial conversion product further converted to introduce a different one of these radicals. Reference to esters includes partial and mixed esters.

After the reaction of the alcohol is complete, the reaction mass may be blown with inert gas, such as nitrogen, to remove any unreacted volatile reagent. If a volatile solvent is used as a diluent, it may be removed at this stage.

The reactions may be conducted in the presence of an inert gas, e. g. nitrogen, if desired.

These new compositions impart many desirable properties to lubricants to which they have been added. They act as very powerful detergents therein, and also as inhibitors of corrosion and lacquer and sludge formation. They improve the viscosity index and have a very striking effect as pour point depressants. They also improve the extreme pressure characteristics of lubricants.

The amount of the above described primary phosphorus sulfide-amine reaction product or ester derivative thereof to be added to an oil or grease will depend upon the characteristics of the oil or grease and the intended use. Some oils have more of a tendency to corrode metals, or to form acids, sludges and lacquer deposits than others, and such oils require larger quantities of the addition agent. Also oils that are intended for higher temperatures require larger amounts of the additive. In general, for lubricating oils the range is from 1 to 10% by weight, but under some circumstances amounts as low as .01% show a significant improvement. For extreme pressure lubricants, the range is from 0.5 to 25.0% by weight. There is no upper limit as the reaction product itself is a lubricant, but, of course, it may be uneconomical to add more than is necessary to impart to the lubricant the desired properties.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

EXAMPLE 1

(a) 800 grams of commercial dioctadecylamine (a mixture of about three parts by weight of dioctadecylamine and one part of trioctadecylamine), 281 grams phosphorus pentasulfide, 1200 grams of No. 300 Red oil (a conventional acid treated Mid-Continent lubricating oil base stock, S. A. E. 30 or slightly lower) and 1200 grams of No. 225 Red oil (a similar oil of S. A. E. 20) were mixed, and heated to 500° F. and maintained at this temperature for 30 minutes, all in an atmosphere of nitrogen and with agitation. As it was being heated between 420° and 498° F., a considerable amount of gas which largely consisted of $H_2S$ was evolved by the mixture. 16 grams of sulfur was added, and the mixture heated for 1 hour at 300° F. The reaction mass was then filtered hot. 3365 grams of dark oily product was obtained as a filtrate. It was an about 29 weight percent concentrate of the additive in the Red oil. It analyzed 13.6% sulfur and 8.0% phosphorus, based on the concentrate.

(b) 200 grams of the above reaction product (a) were mixed with 16.8 grams of tertiary butyl alcohol, and the mixture heated for four hours at 250° F. with agitation. The reaction mass was then blown with nitrogen at 250° F. and the gases leaving the reaction mass were passed through a dry-ice trap to condense out any unreacted tertiary-butyl alcohol. The amount of the alcohol recovered was deducted from the amount initially used and on this basis, the alcohol reacted to give a 100% yield of ester.

EXAMPLE 2

(a) A primary sulfide-amine reaction product was prepared as in Example 1 (a).

(b) 200 grams of the above reaction product (a) and 23.6 grams of amyl mercaptan were mixed and heated for four hours at 250° F. with agitation. The reaction mass was then blown with notrogen at 250° F. and the gases leaving the reaction mass were passed through a dry-ice trap in order to condense out any unreacted amyl mercaptan. Based on the amount of the mercaptan consumed, a 42.7% yield of thio-ester was obtained.

EXAMPLE 3

(a) A primary sulfide-amine reaction product was prepared as in Example 1(a).

(b) 200 grams of the above reaction product (a) and 20.9 grams of phenol were mixed and heated for four hours at 250° F. with agitation. The reaction mass was then blown with nitrogen at 250° F. and the gases leaving the reaction mass were passed through a dry-ice trap in order to condense out any unreacted phenol. Based on the amount of the phenol consumed, a 39.6% yield of ester was obtained.

In order to demonstrate the properties of the various ester derivatives of the new phosphorus sulfide-amine reaction products in improving the characteristics of lubricating oils, a large number of representative additives were incorporated into conventional lubricating oils. The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September 1941, and in another paper by the same authors presented at the New York city meeting of the American Chemical Society in September 1944, published in Industrial and Engineering Chemistry, Analytical edition, vol. 17, No. 5, May 1945, pages 302–309. The latter paper also correlates the results of such laboratory tests with the so-called standardized "Chevrolet engine test."

Essentially the laboratory test equipment consists of a vertical thermostatically heated, large glass test tube, into which is placed a piece of steel tubing of about one third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be treated which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase. The rate of air flow per volume of oil is adjusted to the same as the average for a test engine in operation. Of the catalytic effects, those due to iron are the most important. They are empirically duplicated by the addition of a soluble iron salt. Those due to lead-bromide are duplicated by its addition. In the "Standard" test, 0.012% of iron salt is added; and in the "Iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following tables were obtained from tests using:

a 160 cubic centimeter sample of the lubricant composition
70 liters of air per hour
100 square centimeters of steel surface
4.4 square centimeters of copper-lead surface
1.0 square centimeters of copper surface
0.01% by weight of lead bromide powder
0.05% soluble iron calculated as $Fe_2O_3$
(Ferric 2-ethyl hexoate in C. P. Benzene)

The "Iron tolerance" tests were run at 280° F. for 36 hours. The lacquer is deposited on the steel tube and is determined by difference in weight of the tube after washing with chloroform and drying to constant weight. The corrosion was determined by difference in weight of the copper and heavy metal pieces after scrubbing with chloroform. The used oil was sufficient to enable the determination of all the usual oil tests, viz. isopentane insolubles, viscosity, acid number, etc.

The data in the following table shows the results obtained in testing our new additives by the tests described.

"Iron tolerance" tests on a conventional Mid-Continent solvent extracted lubricating oil base stock (S. A. E. 30) and compositions containing this oil and several ester derivatives of phosphorus pentasulfide-amine reaction products of the invention were run for a number of additives. The results given in the following table are representative.

Table

| Additive From Example No. | None | 1(b) | 2(b) | 3(b) |
|---|---|---|---|---|
| Concentration of Additive in per cent by weight | None | 0.5 | 0.5 | 0.5 |
| Lacquer Deposit (in milligrams) | 1.2 | 0.2 | 0.8 | 1.8 |
| Sludge (isopentane insoluble in milligrams) | 206.4 | 104.2 | 25.2 | 62.1 |
| Corrosion (in milligrams) weight loss of: | | | | |
| Copper | 3.3 | 1.7 | 1.0 | 1.3 |
| Copper-lead | 16.2 | 9.5 | 1.7 | 9.1 |
| Acid Number | 14.5 | 4.5 | 3.9 | 7.23 |
| Viscosity Increase (SUS) | 1,095 | 371 | 358 | 516 |

These data show the marked improvement imparted to the lubricating oil by the ester derivatives of the invention. The very low corrosion and lacquer, as well as the improvements in every indicated characteristic for the amyl mercaptan derivative of Example 2 (b), are particularly noteworthy. The tertiary-butyl alcohol derivative of Example 1 (b) also shows improvements in every indicated characteristic. The phenol derivative of Example 3 (b) should be used in slightly larger amount to achieve lower lacquer. The lacquer inhibition is more strikingly demonstrated on oils other than solvent extracted oils which tend to form lacquer more readily. These improvements are particularly noteworthy when you consider the small amount of the additive (0.5%) used.

In order to prevent foaming of the oil containing a small proportion of the additive, it is desirable in some cases to add a very small amount of tetra-amyl silicate, or an alkyl ortho carbonate, ortho formate or ortho acetate. 0.0003% of polyalkylsilicone oil, or 0.001% of tetra-amyl silicate was found to prevent foaming upon bubbling of air through oil containing a few percent of the additive.

It will be obvious to one skilled in the art that various ester derivatives of sulfide-amine reaction products and similar products obtained by introducing phosphorus and/or sulfur into an amine as prepared according to different procedures, but having substantially the same properties as those herein described, may be made up into lubricant compositions in accordance with the invention. The invention as claimed contemplates such compositions broadly, as come within the following claims.

We claim:

1. A lubricant comprising a mineral lubricating oil and an amount of a reaction product within the range of 0.05 and 10.0 weight per cent to improve said oil in use, said reaction product being prepared by reacting one mole of an organic aliphatic amine having at least one amine hydrogen and an aliphatic radical of at least 12 carbon atoms with an amount within the range of 0.5 to 2.5 moles of a phosphorus sulfide at a temperature in the range of 400° F. to about 600° F. and esterifying the resulting product with an amount of a compound selected from the group consisting of aliphatic alcohols and phenols within the range of 0.2 to 6.0 moles of said compound per mole of product at a temperature in the range of 100° F. to 400° F. to produce an oil dispersible ester derivative suitable for addition to a mineral lubricating oil to inhibit deterioration thereof under service conditions.

2. A lubricant in accordance with claim 1 in which the phosphorus sulfide employed in preparing the reaction product is phosphorus pentasulfide.

3. A lubricant in accordance with claim 1 in which the alcohol employed in preparing the reaction product is an aliphatic thioalcohol.

4. A lubricant in accordance with claim 1 in which the phenol employed in preparing the reaction product is a thiophenol.

5. A lubricant comprising a mineral lubricating oil and an amount of a reaction product within the range of 0.05 to 10.0 weight per cent to improve said oil in use, said reaction product being prepared by reacting one mole of an organic aliphatic amine having at least one amine hydrogen and an aliphatic radical of at least 12 carbon atoms with an amount within the range of 0.5 to 2.5 moles of a phosphorus sulfide at a temperature in the range of 400° F. to about 600° F., reacting the resulting product with an amount of sulfur within the range of 0.01 to 2.0 gram atoms per gram mole of the product at a temperature in the range of 200° F. to about 300° F. and esterifying the resulting product with an amount of a compound selected from the group consisting of aliphatic alcohols and phenols within the range of 0.2 to 6.0 moles of said compound per mole of product at a temperature in the range of 100° F. to 400° F. to produce an oil dispersible ester derivative suitable for addition to a mineral lubricating oil to inhibit deterioration thereof under service conditions.

6. A lubricant in accordance with claim 5 in which the phosphorus sulfide employed in preparing the reaction product is phosphorus pentasulfide.

7. A lubricant in accordance with claim 5 in which the alcohol employed in preparing the reaction product is an aliphatic thioalcohol.

8. A lubricant in accordance with claim 5 in which the phenol employed in preparing the reaction product is a thiophenol.

9. As a composition usable for lubricant purposes a reaction product prepared by reacting one mole of an organic aliphatic amine having at least one amine hydrogen and an aliphatic radical of at least 12 carbon atoms with an amount within the range of 0.5 to 2.5 moles of a phosphorus sulfide at a temperature in the range of 400° F. to about 600° F. and esterifying the resulting product with an amount of a compound selected from the group consisting of aliphatic alcohols and phenols within the range of 0.2 to 6.0 moles of said compound per mole of product at a temperature in the range of 100° F. to 400° F. to produce an oil dispersible ester derivative suitable for addition to a mineral lubricating oil to inhibit deterioration thereof under service conditions.

10. A lubricant in accordance with claim 9 in which the phosphorus sulfide employed in preparing the reaction product is phosphorus pentasulfide.

11. A lubricant in accordance with claim 9 in which the alcohol employed in preparing the reaction product is an aliphatic thioalcohol.

12. A lubricant in accordance with claim 9 in which the phenol employed in preparing the reaction product is a thiophenol.

13. As a composition usable for lubricant purposes a reaction product prepared by reacting one mole of an organic aliphatic amine having at least one amine hydrogen and an aliphatic radical of at least 12 carbon atoms with an amount within the range of 0.5 to 2.5 moles of a phosphorus sulfide at a temperature in the range of 400° F. to about 600° F., reacting the resulting product with an amount of sulfur within the range of 0.01 to 2.0 gram atoms per gram mole of the product at a temperature in the range of 200° F. to about 300° F. and esterifying the resulting product with an amount of a compound selected from the group consisting of aliphatic alcohols and phenols within the range of 0.2 to 6.0 moles of said compound per mole of product at a temperature in the range of 100° F. to 400° F. to produce an oil dispersible ester derivative suitable for addition to a mineral lubricating oil to inhibit deterioration thereof under service conditions.

14. A lubricant in accordance with claim 13 in which the phosphorus sulfide employed in preparing the reaction product is phosphorus pentasulfide.

15. A lubricant in accordance with claim 13 in which the alcohol employed in preparing the reaction product is an aliphatic thioalcohol.

16. A lubricant in accordance with claim 13 in which the phenol employed in preparing the reaction product is a thiophenol.

EVERETT C. HUGHES.
JOHN D. BARTLESON.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,403,894 | Bartleson | June 23, 1945 |